(12) United States Patent
Hoelzle et al.

(10) Patent No.: US 8,688,687 B1
(45) Date of Patent: Apr. 1, 2014

(54) HYPERTEXT BROWSER ASSISTANT

(75) Inventors: Urs Hoelzle, Palo Alto, CA (US); Monika H Henzinger, Menlo Park, CA (US); Lawrence E Page, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/615,896

(22) Filed: Sep. 14, 2012

Related U.S. Application Data

(63) Continuation of application No. 13/244,887, filed on Sep. 26, 2011, now Pat. No. 8,316,016, which is a continuation of application No. 12/178,748, filed on Jul. 24, 2008, which is a continuation of application No. 09/734,886, filed on Dec. 13, 2000, now Pat. No. 7,421,432.

(60) Provisional application No. 60/171,019, filed on Dec. 15, 1999.

(51) Int. Cl.
*G06F 17/30* (2006.01)

(52) U.S. Cl.
CPC .... G06F 17/30463 (2013.01); G06F 17/30864 (2013.01)
USPC ............................ 707/713; 707/723; 707/769

(58) Field of Classification Search
CPC .................... G06F 17/30424; G06F 17/30463; G06F 17/30864
USPC .................................. 707/706, 713, 769, 723
See application file for complete search history.

(56) References Cited

U.S. PATENT DOCUMENTS

| | | |
|---|---|---|
| 5,220,625 A | 6/1993 | Hatakeyama et al. |
| 5,241,671 A | 8/1993 | Reed et al. |
| 5,278,980 A | 1/1994 | Pedersen et al. |
| 5,295,243 A | 3/1994 | Robertson et al. |
| 5,350,303 A | 9/1994 | Fox et al. |
| 5,471,382 A | 11/1995 | Tallman et al. |
| 5,584,024 A | 12/1996 | Shwartz |
| 5,619,688 A | 4/1997 | Bosworth et al. |
| 5,623,679 A | 4/1997 | Rivette et al. |
| 5,727,129 A | 3/1998 | Barrett et al. |
| 5,761,655 A | 6/1998 | Hoffman |
| 5,768,581 A | 6/1998 | Cochran |

(Continued)

OTHER PUBLICATIONS

Co-pending U.S. Appl. No. 12/178,748, filed Jul. 24, 2008, entitled "Hypertext Browser Assitant", by Hoelzle et al., 51 pages.

(Continued)

*Primary Examiner* — Shahid Alam
(74) *Attorney, Agent, or Firm* — Harrity & Harrity, LLP

(57) ABSTRACT

A system facilitates a search by a user. The system detects selection of one or more words in a document currently accessed by the user, generates a search query using the selected word(s), and retrieves a document based on the search query. When the document includes one or more links corresponding to a linked document, the system analyzes each of the links, prefetches the linked documents corresponding to a number of the links, and presents the document to the user. The system receives selection of one of the links and retrieves the linked document corresponding to the selected link. The system identifies one or more pieces of information in the retrieved document, determines a link to a related document for each of the identified pieces of information, and provides the determined links with the related document to the user.

21 Claims, 10 Drawing Sheets

(56) References Cited

U.S. PATENT DOCUMENTS

| | | | |
|---|---|---|---|
| 5,822,539 | A | 10/1998 | Van Hoff |
| 5,826,025 | A | 10/1998 | Gramlich |
| 5,907,837 | A | 5/1999 | Ferrel et al. |
| 5,920,859 | A * | 7/1999 | Li .................................. 707/769 |
| 5,950,190 | A | 9/1999 | Yeager et al. |
| 5,963,940 | A | 10/1999 | Liddy et al. |
| 6,011,537 | A | 1/2000 | Slotznick |
| 6,012,055 | A | 1/2000 | Campbell et al. |
| 6,026,409 | A | 2/2000 | Blumenthal |
| 6,112,202 | A | 8/2000 | Kleinberg |
| 6,112,203 | A | 8/2000 | Bharat et al. |
| 6,134,532 | A | 10/2000 | Lazarus et al. |
| 6,154,757 | A | 11/2000 | Krause et al. |
| 6,223,145 | B1 | 4/2001 | Hearst |
| 6,226,648 | B1 | 5/2001 | Appleman et al. |
| 6,356,899 | B1 | 3/2002 | Chakrabarti et al. |
| 6,418,433 | B1 | 7/2002 | Chakrabarti et al. |
| 6,493,702 | B1 | 12/2002 | Adar et al. |
| 6,523,022 | B1 | 2/2003 | Hobbs |
| 6,549,897 | B1 | 4/2003 | Katariya et al. |
| 6,564,202 | B1 | 5/2003 | Schuetze et al. |
| 6,631,522 | B1 | 10/2003 | Erdelyi |
| 6,704,722 | B2 | 3/2004 | Wang Baldonado |
| 6,728,752 | B1 | 4/2004 | Chen et al. |
| 6,741,967 | B1 | 5/2004 | Wu et al. |
| 7,421,432 | B1 | 9/2008 | Hoelzle et al. |
| 8,316,016 | B1 | 11/2012 | Hoelzle et al. |
| 2002/0130891 | A1 | 9/2002 | Singer |

OTHER PUBLICATIONS

P. Maglio et al., "Intermediaries personalize information streams," Communications of the ACM, 43(8), Aug. 2000, pp. 96-101.

S. Kelin, "Digital Persona: A gateway to personal information," M.Eng. thesis, MIT, Cambridge, MA, Feb. 1999, 104 pages.

M. Dyer, "In-Depth Understanding," Cambridge, MA, MIT Press, 1983, 474 pages.

R. Barrett et al., "Intermediaries: An approach to manipulating information streams," IBM Systems Journal, vol. 38, pp. 629-641 (1999).

R. Barrett et al., "Intermediaries: New places for producing and manipulating web content," In Proceedings of the Seventh International World Wide Web Conference (WWW7), Brisbane, Australia (1998); 14 pages.

R. Barrett et al., "How to personalize the web," In Proceedings of the ACM Conference on Human Factors in Computing Systems (CHI'97), Atlanta, GA (1997); 16 pages.

R. Barrett et al., "WBI: A confederation of agents that personalize the web," In Proceedings of the First International Conference on Autonomous Agents, Marina Del Rey, CA (1997); 4 pages.

S. Ihde et al., "Intermediary-based transcoding framework," IBM Systems Journal, vol. 40, No. 1 (2001); 14 pages.

C.S. Campbell et al., "Facilitating navigation in information spaces: Road signs on the World Wide Web," International Journal of Human-Computer Studies, vol. 50, pp. 309-327 (1999).

J. Meyer, "How to manage, negotiate, and transfer personal information on the Web," Diploma thesis, University of Applied Sciences, Hamburg, Germany (1999); 126 pages.

P.P. Maglio et al., "WebPlaces: Adding people to the web," In Poster Proceedings of the Eighth International World Wide Web Conference, Toronto, Canada (1999); 5 pages.

G.M. Underwood, "User-centered push for timely information delivery," In Proceedings of the Seventh International World Wide Web Conference (WWW7), Brisbane, Australia (1998); 12 pages.

P.P. Maglio, "How to build modeling agents to support web searchers," In Proceedings of the Sixth International Conference on User Modeling, Sardinia, Italy (1997); 12 pages.

G. Salton, "The Smart Environment for Retrieval System Evaluation—Advantages and Problem Areas," Information Retrieval Experiment, K. Sparck Jones (ed.) London, Butterworth, pp. 316-329, 1981.

S. Brin et al., "The Anatomy of a Large-Scale Hypertextual Web Search Engine," In Proceedings of the Seventh International World Wide Web Conference, pp. 107-117, 1998.

* cited by examiner

Net Search: General Tips
... Google automatically prefers pages where ... found in close proximity.
However, sometimes ... that word. Automatic AND ... and" queries. That is ...
some search engines ...
home.netscape.com/escapes/search/tips_E.html - 14k - Cached - Similar pages Advanced Searching
... between a "close" or a ... using a proximity operator. We ... searcher normally
prefers to split ... simple queries [2]. Others ... your search strategy ... is
automatic truncation ...
www.onlineinc.com/onlinemag/MayOL/zorn5.html - 43k - Cached - Similar pages Data Management White Papers
... and it prefers to have the ... process more automatic and less ... that match
search criteria-clouds ... passes the queries to UDB ... stored in close proximity
to the ...
www.software.ibm.com/data/pubs/papers/datalink.html - 66k - Cached - Similar pages Google Search
... Google automatically prefers pages where ... found in close proximity.
However, sometimes ... that
word. Automatic AND ... and" queries. That is ... some search engines ...
www.maf.govt.nz/MAFnet/links/google.htm - 16k - Cached - Similar pages

FIG. 7

Google (www.google.com) performs "and" queries by default, so it only returns those pages that include all of the search terms. To restrict a search further, just include more terms. Google (www.google.com) also automatically prefers pages in which the query terms are in close proximity. For example, to plan a vacation to Hawaii (www.hawaii.gov), simply enter Hawaii vacation (www.hshawaii.com) into the search filed and click on Google (www.google.com) Search.

FIG. 10

HYPERTEXT BROWSER ASSISTANT

RELATED APPLICATIONS

This application is a continuation of U.S. application Ser. No. 13/244,887, filed Sep. 26, 2011, which is a continuation of U.S. application Ser. No. 12/178,748, filed Jul. 24, 2008 which is a continuation of U.S. application Ser. No. 09/734,886, filed Dec. 13, 2000, now U.S. Pat. No. 7,421,432, which claims priority under 35 U.S.C. §119(e) based on U.S. Provisional Application Ser. No. 60/171,019, filed Dec. 15, 1999, the disclosures of which are incorporated herein by reference.

BACKGROUND OF THE INVENTION

A. Field of the Invention

The present invention relates generally to information retrieval systems and, more particularly, to a hypertext browsing assistant that improves search-related activities.

B. Description of Related Art

Conventional techniques for searching a hypertext medium, such as the World Wide Web ("web"), are replete with deficiencies. For example, a user typically uses a web browser, such as Netscape Navigator or Microsoft Internet Explorer, to perform a search on the web. Many conventional techniques for searching the web require that the user leave the document the user is currently viewing. To perform the search, the user typically must access a search engine or hierarchical web directory and enter one or more keywords. This a time-consuming and cumbersome process.

Also, conventional web-searching techniques are slow because the user must wait for the desired document to load into the web browser. This can be a time consuming process that often depends on the speed of the user's connection to the web.

The documents, such as web pages, that result from these searches frequently do not contain links to all of the topics discussed in the documents and the links they do contain often include insufficient information regarding the link. As a result, it is often difficult to distinguish which links point to high quality and relevant content and which do not.

Therefore, there exists a need for overcoming the deficiencies of conventional searching techniques.

SUMMARY OF THE INVENTION

Systems and methods consistent with the present invention address this and other needs by providing a hypertext browser assistant that provides additional functionality to conventional web browsers. For example, the hypertext browser assistant may permit a user to use a search engine or hierarchical directory without leaving a current document; may prefetch certain documents to reduce the waiting time for the user; and may provide links to documents relating to information in a retrieved document.

In accordance with the purpose of the invention as embodied and broadly described herein, a method facilitates the performance of a search. The method includes obtaining selection of one or more words in a document currently accessed by a user; generating a search query using the selected word(s); retrieving search results based on the search query; and presenting the search results to the user.

In another implementation consistent with the present invention, a method prefetches documents associated with a search. The method includes identifying a document that includes one or more links, where each of the links corresponds to a linked document; analyzing each of the links in the document; and prefetching the linked documents corresponding to a number of the links.

In a further implementation consistent with the present invention, a method supplements a document with links to related documents. The method includes analyzing a document to identify one or more pieces of information; determining a link to a related document for each of the identified pieces of information; and embedding the links in the document.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 7 illustrates possible search results provided by a search engine in response to an exemplary paragraph selection;

FIG. 10 illustrates a document modified to include additional links in a manner consistent with the present invention.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention provide a browser assistant that provides additional search-related functionality to a web browser to improve a user's searching experience. For example, the browser assistant may facilitate a search by permitting the user to use a search engine or hierarchical directory without leaving a current document; may expedite a search by prefetching certain documents; and may improve search results by providing links to documents related to information in the current document.

Exemplary Network

Figure 1:
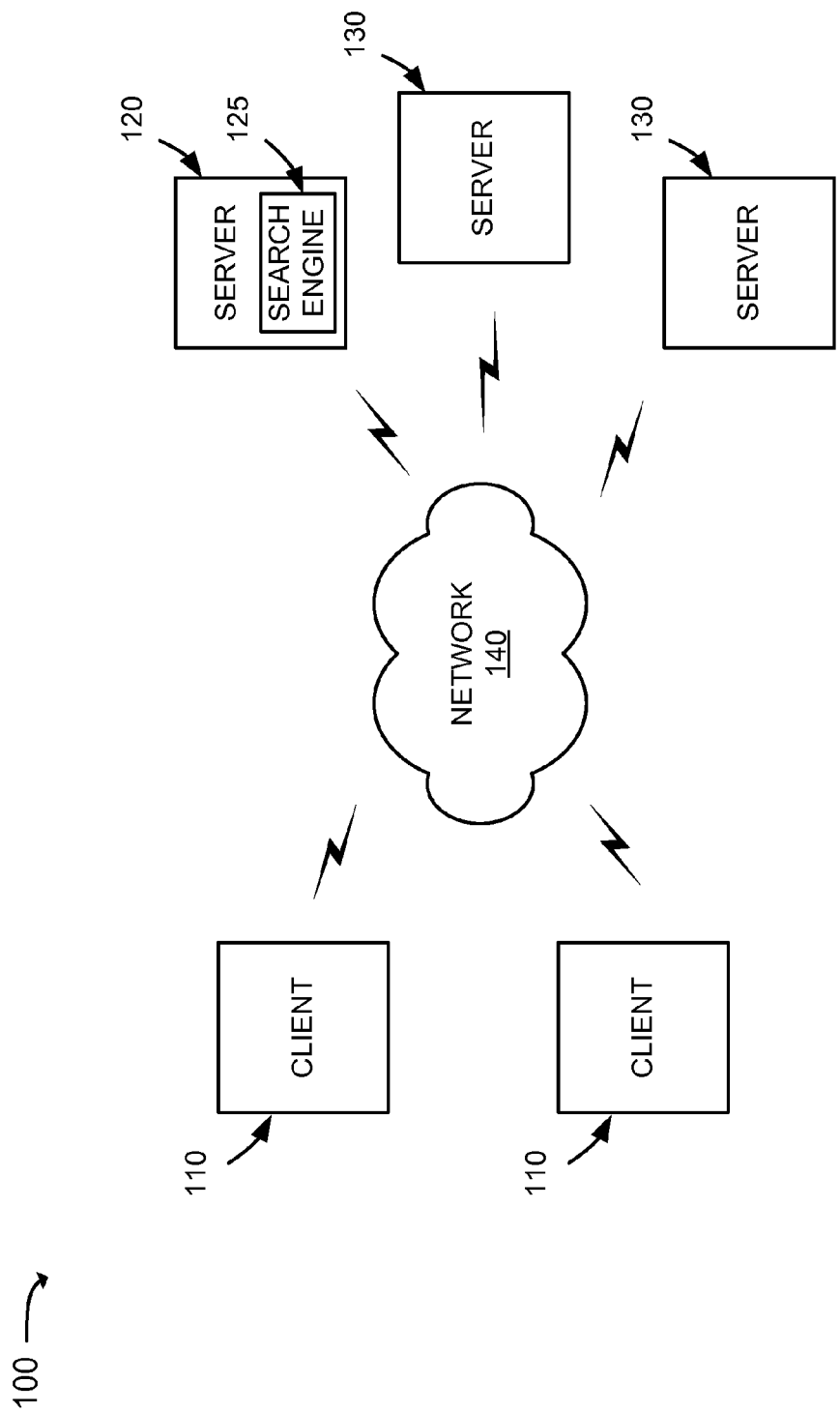
FIG. 1 is a diagram of an exemplary network in which systems and methods consistent with the present invention may be implemented.

FIG. 1 is an exemplary diagram of a network 100 in which systems and methods consistent with the present invention may be implemented. The network 100 may include multiple clients 110 connected to multiple servers 120-130 via a network 140. The network 140 may include a local area network (LAN), a wide area network (WAN), a telephone network, such as the Public Switched Telephone Network (PSTN), an intranet, the Internet, a similar or dissimilar network, or a combination of networks. Two clients 110 and three servers 120-130 have been illustrated as connected to network 140 in FIG. 1 for simplicity. In practice, there may be more or less clients and servers. Also, in some instances, a client may perform the functions of a server and a server may perform the functions of a client.

The clients 110 may include devices, such as wireless telephones, personal computers, personal digital assistants (PDAs), lap tops, etc., threads or processes running on these devices, and/or objects executable by these devices. The servers 120-130 may include server devices, threads, and/or objects that operate upon, search, or maintain documents in a manner consistent with the present invention. The clients 110 and servers 120-130 may connect to the network 140 via wired, wireless, or optical connections.

In an implementation consistent with the present invention, the server 120 may include a search engine 125 usable by the clients 110. The servers 130 may store documents accessible by the clients 110.

Exemplary Client Architecture

Figure 2:
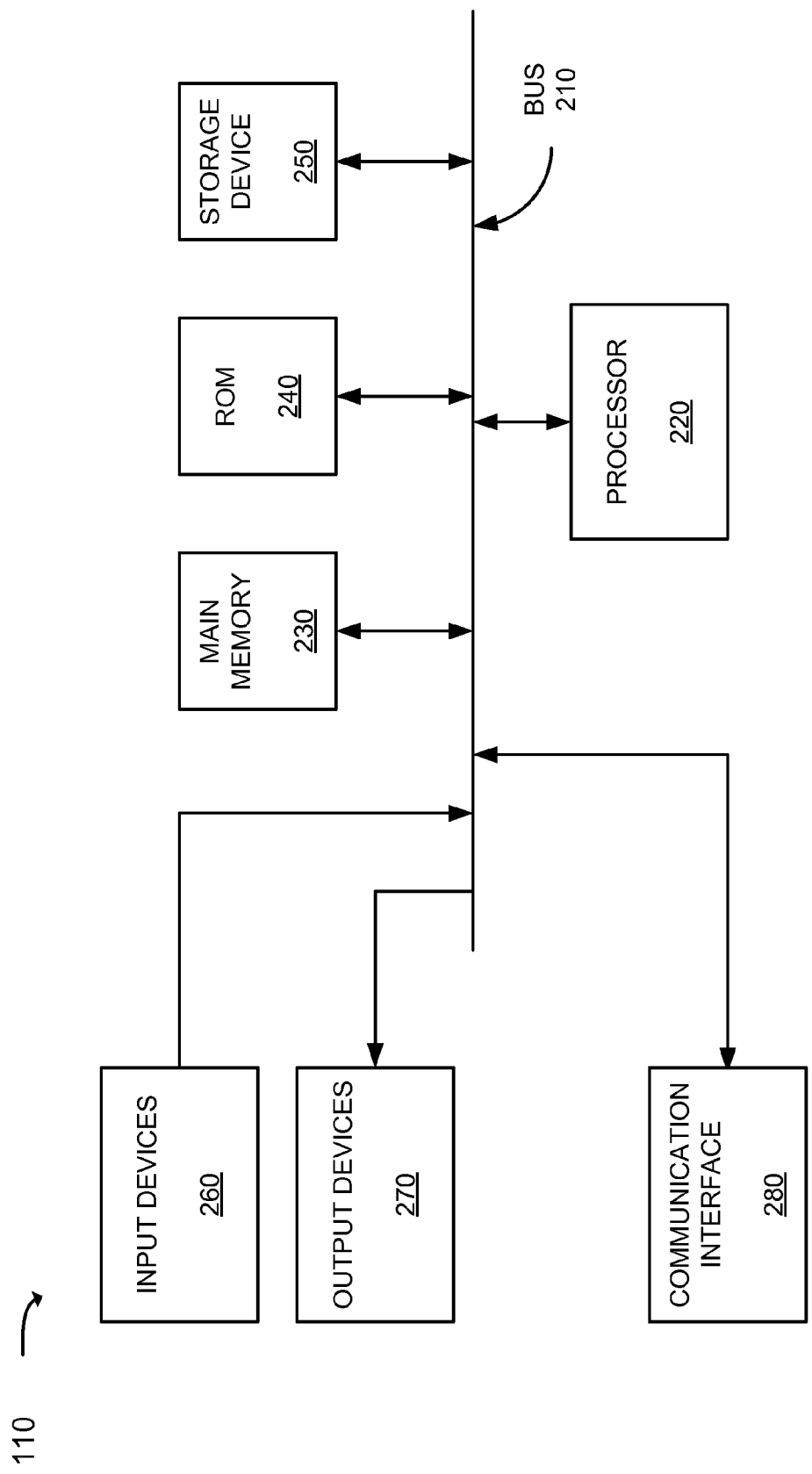
FIG. 2 is an exemplary diagram of a client of FIG. 1 in an implementation consistent with the present invention.

FIG. 2 is an exemplary diagram of a client 110 in an implementation consistent with the present invention. The client 110 may include a bus 210, a processor 220, a main memory 230, a read only memory (ROM) 240, a storage device 250, one or more input devices 260, one or more output devices 270, and a communication interface 280. The bus 210 may include one or more conductors that permit communication among the components of the client 110.

The processor 220 may include any type of conventional processor or microprocessor that interprets and executes instructions. The main memory 230 may include a random access memory (RAM) or another type of dynamic storage device that stores information and instructions for execution by the processor 220. The ROM 240 may include a conventional ROM device or another type of static storage device that stores static information and instructions for use by the processor 220. The storage device 250 may include a magnetic and/or optical recording medium and its corresponding drive.

The input devices 260 may include one or more conventional mechanisms that permit a user to input information to the client 110, such as a keyboard, a mouse, a pen, voice recognition and/or biometric mechanisms, etc. The output devices 270 may include one or more conventional mechanisms that output information to the user, including a display, a printer, a speaker, etc. The communication interface 280 may include any transceiver-like mechanism that enables the client 110 to communicate with other devices and/or systems. For example, the communication interface 280 may include mechanisms for communicating with another device or system via a network, such as network 140.

As will be described in detail below, the clients 110, consistent with the present invention, perform certain search-related operations. The clients 110 may perform these operations in response to processor 220 executing software instructions contained in a computer-readable medium, such as memory 230. A computer-readable medium may be defined as one or more memory devices and/or carrier waves.

The software instructions may be read into memory 230 from another computer-readable medium, such as the data storage device 250, or from another device via the communication interface 280. The software instructions contained in memory 230 causes processor 220 to perform processes that will be described later. Alternatively, hardwired circuitry may be used in place of or in combination with software instructions to implement processes consistent with the present invention. Thus, the present invention is not limited to any specific combination of hardware circuitry and software.

Exemplary Computer-Readable Medium

Figure 3:
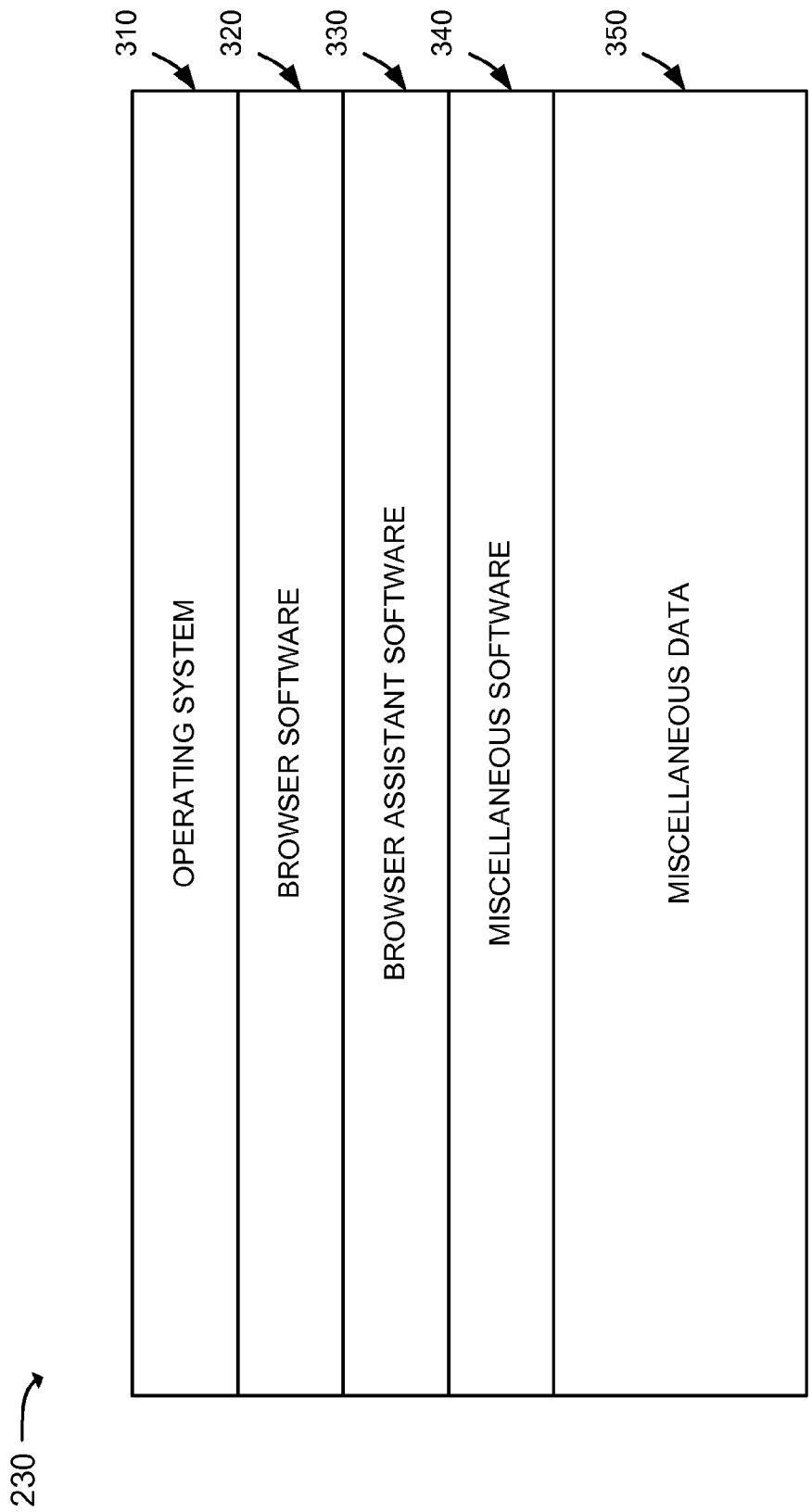
FIG. 3 is a diagram of an exemplary computer-readable medium used by the clients of FIG. 1 according to an implementation consistent with the present invention.

FIG. 3 is a diagram of an exemplary computer-readable medium used by the clients 110 according to an implementation consistent with the present invention. In this implementation, the computer-readable medium includes memory 230. The memory 230 may include an operating system 310, browser software 320, browser assistant software 330, miscellaneous other software 340, and miscellaneous data 350.

The operating system 310 may include conventional operating system software, such as the Windows, Unix, or Linux operating systems. The browser software 320 may include conventional web browser software, such as the Microsoft Internet Explorer or Netscape Navigator browsers.

The browser assistant software 330 may include a plug-in, an applet, a dynamic link library (DLL), or a similar executable object or process. The client 110 may obtain the plug-in from the server 120 or from a third party, such as a third party server, disk, tape, network, CD-ROM, etc. Alternatively, the plug-in may be pre-installed on the client 110.

In another implementation consistent with the present invention, the browser assistant 330 is part of the browser 320. In this implementation, the browser 320 performs the functions of the browser assistant 330. In yet another implementation, the browser assistant 330 is a process separate from and runs concurrently with the browser 320. In this implementation, the browser assistant 330 may interface between the browser 320 and the network 140.

The browser assistant 330 may be automatically activated upon initiation of the browser 320. Alternatively, the browser assistant 330 may be activated when instructed by a user. In either case, the browser assistant 330 may take the form of a graphical user interface, such as a tool bar, software button, or menu, that provides an extension to the browser 320.

Figure 4:
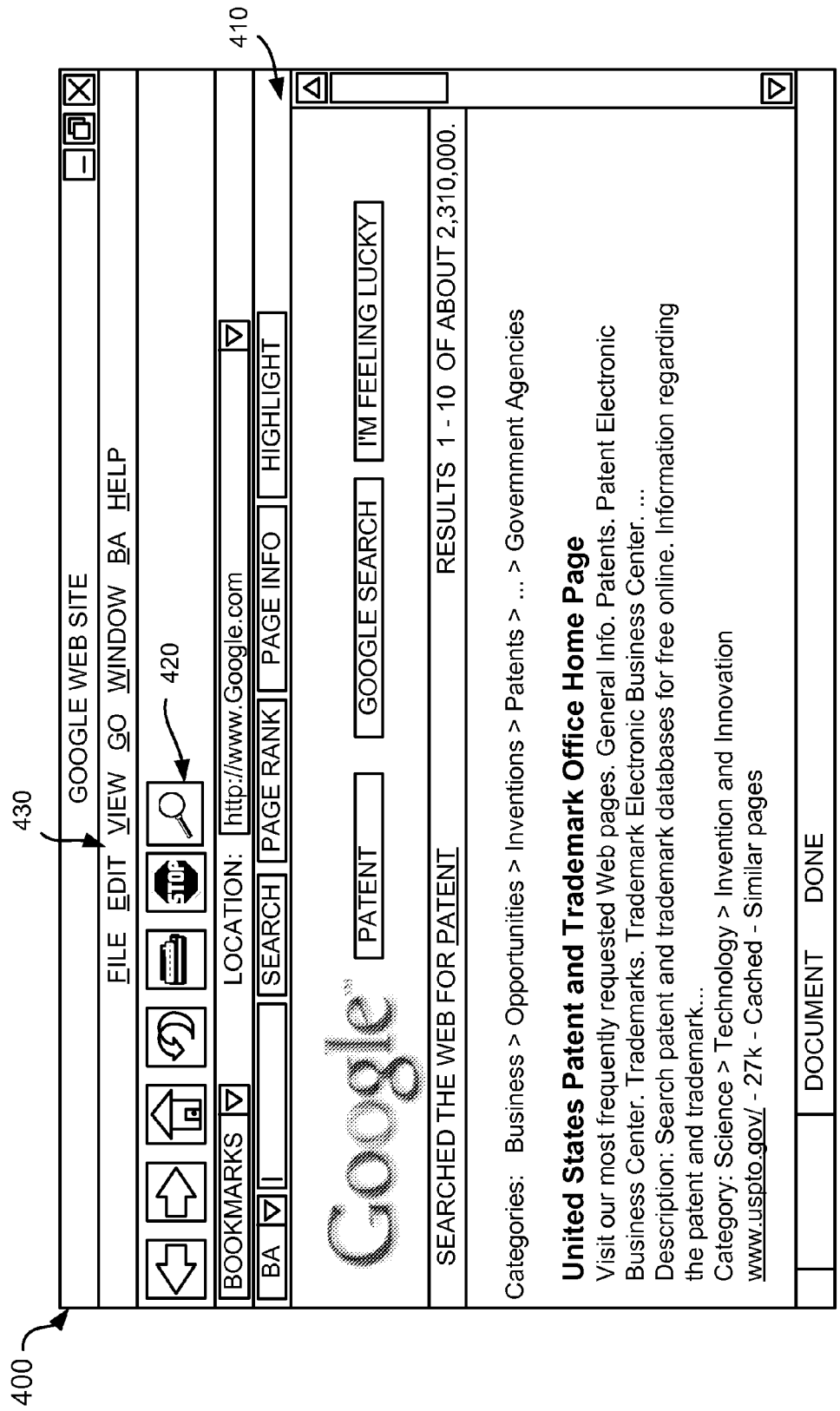
FIG. 4 is an exemplary diagram of a graphical user interface that includes the browser assistant of FIG. 3 according to an implementation consistent with the present invention.

FIG. 4 is an exemplary diagram of a graphical user interface 400 that includes a browser assistant (BA) 330 according to an implementation consistent with the present invention. The graphical user interface 400 illustrated in FIG. 4 shows three forms of the browser assistant 330: a tool bar 410, a software button 420, and a menu 430. The browser assistant 330 may take other forms.

The tool bar 410 includes software buttons and/or menus selectable by a user to initiate different operations by the browser assistant 330. In this case, a user may activate the browser assistant 330 by selecting one of the software buttons and/or menus. The software button 420 may be selectable by a user to initiate the browser assistant 330 functionality. In this case, a user may activate the browser assistant 330 by selecting the button using, for example, a mouse. The menu 430 may provide a list of functions that the browser assistant 330 is capable of performing. A user may select from the list to activate the browser assistant 330 and instruct the browser assistant 330 to perform the desired function.

As described in more detail below, the browser assistant 330 may perform many search-related functions to enhance a user's search experience. The browser assistant 330 may attach to the browser 320 to provide additional functionality to the user.

Returning to FIG. 3, the miscellaneous other software 340 and miscellaneous data 350 may include programs and data used by the client 110 to perform search-related and non-search-related operations.

Exemplary Server Architecture

Figure 5:
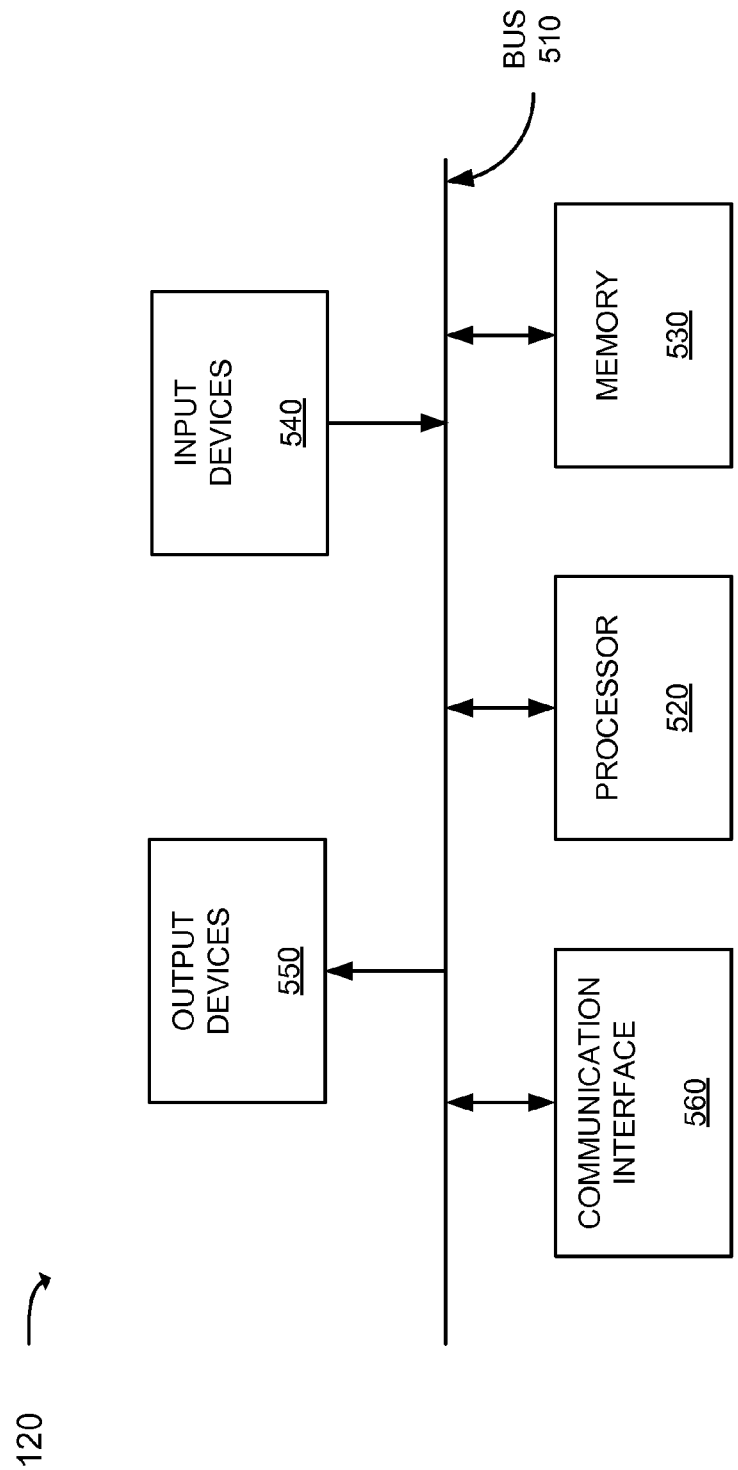
FIG. 5 is an exemplary diagram of a server of FIG. 1 according to an implementation consistent with the present invention.

FIG. 5 is an exemplary diagram of the server 120 according to an implementation consistent with the present invention. The servers 130 may be similarly configured.

The server 120 may include a bus 510, a processor 520, a memory 530, one or more input devices 540, one or more output devices 550, and a communication interface 560. The bus 510 permits communication among the components of the server 120. The processor 520 may include any type of conventional processor or microprocessor that interprets and executes instructions. The memory 530 may include a RAM or another type of dynamic storage device that stores information and instructions for execution by the processor 520; a ROM or another type of static storage device that stores static information and instructions for use by the processor 520; and/or some other type of magnetic or optical recording medium and its corresponding drive.

The input devices 540 may include one or more conventional mechanisms that permit an operator to input information into the server 120, such as a keyboard, mouse, pen, etc. The output devices 550 may include one or more conventional mechanisms that output information to the operator, including a display, a printer, a speaker, etc. The communication interface 560 may include any transceiver-like mechanism that enables the server 120 to communicate with other devices and systems via a network, such as the network 140.

As will be described in detail below, the server 120, consistent with the present invention, performs certain search-related operations. The server 120 may perform these operations in response to processor 520 executing software instructions contained in a computer-readable medium, such as memory 530. The software instructions may be read into memory 530 from another computer-readable medium or from another device via the communication interface 560. The software instructions contained in memory 530 causes processor 520 to perform processes that will be described later. Alternatively, hardwired circuitry may be used in place of or in combination with software instructions to implement processes consistent with the present invention. Thus, the present invention is not limited to any specific combination of hardware circuitry and software.

Exemplary Processing for Initiating a Search

Figure 6:
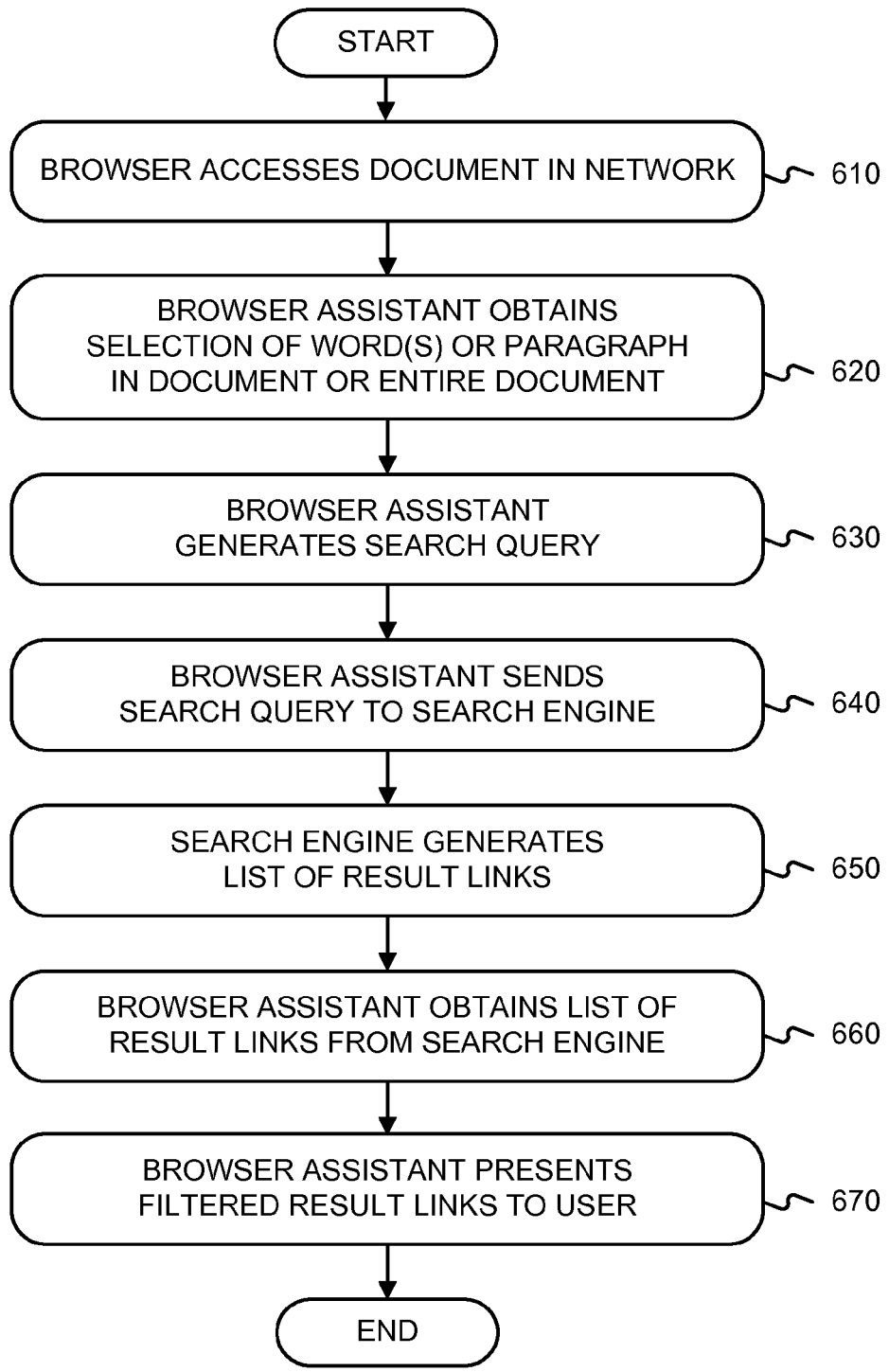
FIG. 6 is a flowchart of exemplary processing for initiating a search in accordance with an implementation consistent with the present invention.

FIG. 6 is a flowchart of exemplary processing for initiating a search in accordance with an implementation consistent with the present invention. Processing may begin with a user activating web browser software, such as browser 320 (FIG. 3), on a client, such as client 110 (FIG. 1). The user may then provide an address, such as a Uniform Resource Locator (URL), of a document to the browser 320 or a query that the browser 320 may use to obtain one or more documents using a hierarchical directory or search engine, such as the search engine 125 maintained by the server 120.

The browser 320 may use the address or query to obtain a document maintained by a server, such as server 130, in the network 140 [act 610]. The browser 320 may then display the document to the user. If the user then desires to use, for example, a search engine, such as the search engine 125, to perform a search, the user need not leave the document currently displayed by the browser 320.

The user may select a word, phrase, or paragraph in the document or select the entire document for a search. A phrase may be defined as a collection of two or more words (e.g., vacations in Hawaii) or a quoted phrase (i.e., two or more words that are treated as a single unit (e.g., "vacations in Hawaii")).

If selecting a word, the user may click on the word, position a pointer, such as a cursor, over the word, or highlight the word in a conventional manner. If selecting a phrase or paragraph, the user may highlight the words forming the phrase or paragraph. If selecting an entire document, the user may select a software button or menu item provided, for example, by the browser assistant 330.

The browser assistant 330 may detect the selection by the user, automatically or in response to an action by the user [act 620]. If the user selected a word or phrase, the browser assistant 330 may analyze the document to identify the word or phrase selected. In the case of a word selection, the browser assistant 330 may treat the selected word as a search term for a query to the search engine 125. In the case of a phrase selection, the browser assistant 330 may treat the entire phrase or the words making up the phrase as one or more search terms for a query. For example, the browser assistant 330 may treat the entire phrase as a single search term. Alternatively, the browser assistant 330 may combine, such as by ANDing, the words of the phrase together for the query. In the latter case, the browser assistant 330 may also analyze the words making up the phrase and discard stop words, such as "the," "a," "an," "of," etc.

If the user selected a paragraph or the entire document, the browser assistant 330 may analyze the paragraph or document to determine the main textual concepts. The browser assistant 330 may use different conventional techniques to determine the main textual concepts. For example, the browser assistant 330 may use a summarization technique, such as the one described in M. Dyer, "In-Depth Understanding," Cambridge, Mass.: MIT Press, 1983, to determine the main textual concepts. In another implementation, the browser assistant 330 may use a vector space model, such as the one described in G. Salton, "The SMART Environment for Retrieval System Evaluation—Advantages and Problem Areas," Information Retrieval Experiment, K. Sparck Jones (ed.) London, Butterworth, pp. 316-329, 1981, to determine the main textual concepts. In yet another implementation, the browser assistant 330 may use all of the text in the paragraph or document as the main textual concepts. In this case, the browser assistant 330 may ignore stop words, such as "the," "a," "an," "of," etc., from the main textual concepts. The browser assistant 330 may use the determined concepts as one or more search terms for a query to the search engine 125.

In any event, the browser assistant 330 may generate a search query based on one or more search terms from the selected word, phrase, paragraph, or document [act 630]. The browser assistant 330 may generate a request to query the search engine 125 using the search query and send the request to the search engine 125 [act 640].

In response to the request, the search engine 125 may generate data that contains the search results and send the search results to the browser assistant 330 [act 650]. In an implementation consistent with the present invention, the search engine 125 provides the search results as a HyperText Markup Language (HTML) document, similar to search results provided by conventional search engines. Alternatively, the search engine 125 may provide the search results according to a protocol agreed upon by the search engine 125 and the browser assistant 330.

In an implementation consistent with the present invention, the search results include links to documents (e.g., web pages) and possibly a textual description of the links. In another implementation, the search results include links to directory nodes within a hierarchical directory and possibly textual descriptions for the directory nodes. In other implementations, the search results include a combination of these links.

The browser assistant 330 receives the list of result links from the search engine 125 [act 660]. If the list of result links takes the form of an HTML document, then the browser assistant 330 may parse the document to determine the links that are search results. The browser assistant 330 may then present the result links to the user [act 670]. For example, the browser assistant 330 may present the result links as a web page in a browser window. Alternatively, the browser assistant 330 may present the result links as a list of selectable items within a user interface of the browser assistant 330. In one instance, the user interface of the browser assistant 330 includes a pull-down or pop-up menu. In another instance, the user interface includes a side-bar or a scrolling list. The browser assistant 330 may also provide a select-box next to each of the result links to facilitate selection of one or more links by the user. The browser assistant 330 may then retrieve documents corresponding to the selected links.

The browser assistant 330 may also present links related to the result links, either in conjunction to or separately from the result links. In this case, the browser assistant 330 may query a server, such as the server 120 or 130, that includes a related-links finder that identifies related links. The browser assistant 330 may send a query to the server 120/130 for each link individually or for all links collectively. The server 120/130 may then identify related links and return them to the browser assistant 330. Alternatively, the browser assistant 330 may identify the related links itself.

If the search engine 125 implements a hierarchical directory, the results of the search may consist of a list of highly ranked directory hierarchy nodes or categories. In this case, the browser assistant 330 may download information regarding the highly ranked directory hierarchy nodes or categories and display a list of the highly ranked directory hierarchy nodes or categories (e.g., "Recreation: Travel"), a list of the actual documents and/or links within the highly ranked directory nodes or categories (e.g., the actual documents and/or links under "Recreation: Travel"), or a list of both the highly ranked directory hierarchy nodes or categories and the actual documents and/or links within the highly ranked directory nodes or categories.

Once the result links and the related links, if any, are identified, the browser assistant 330 may rank them in some manner, such as by assigning scores to the links or by alphabetizing them. Alternatively, the browser assistant 330 may rank them in the same order as provided by the server 120 or 130.

To illustrate the above processing, assume that the user selects the following paragraph for a search:

Google performs "and" queries by default, so it only returns those pages that include all of the search terms. To restrict a search further, just include more terms. Google also automatically prefers pages in which the query terms are in close proximity. For example, to plan a vacation to Hawaii, simply enter Hawaii vacation into the search field and click on Google Search.

The browser assistant 330 may use one of the techniques described above to determine the main textual concepts. For example, the browser assistant 330 may identify the following key concepts: Search, automatic "and" queries, prefers close proximity. The browser assistant 330 may use these key concepts to generate a search query and send the search query to a search engine. FIG. 7 illustrates possible search results provided by the search engine in response to an exemplary paragraph selection. As illustrated, the search results include a set of links to documents that include the key concepts from the selected paragraph.

Exemplary Processing for Prefetching Documents

Figure 8:
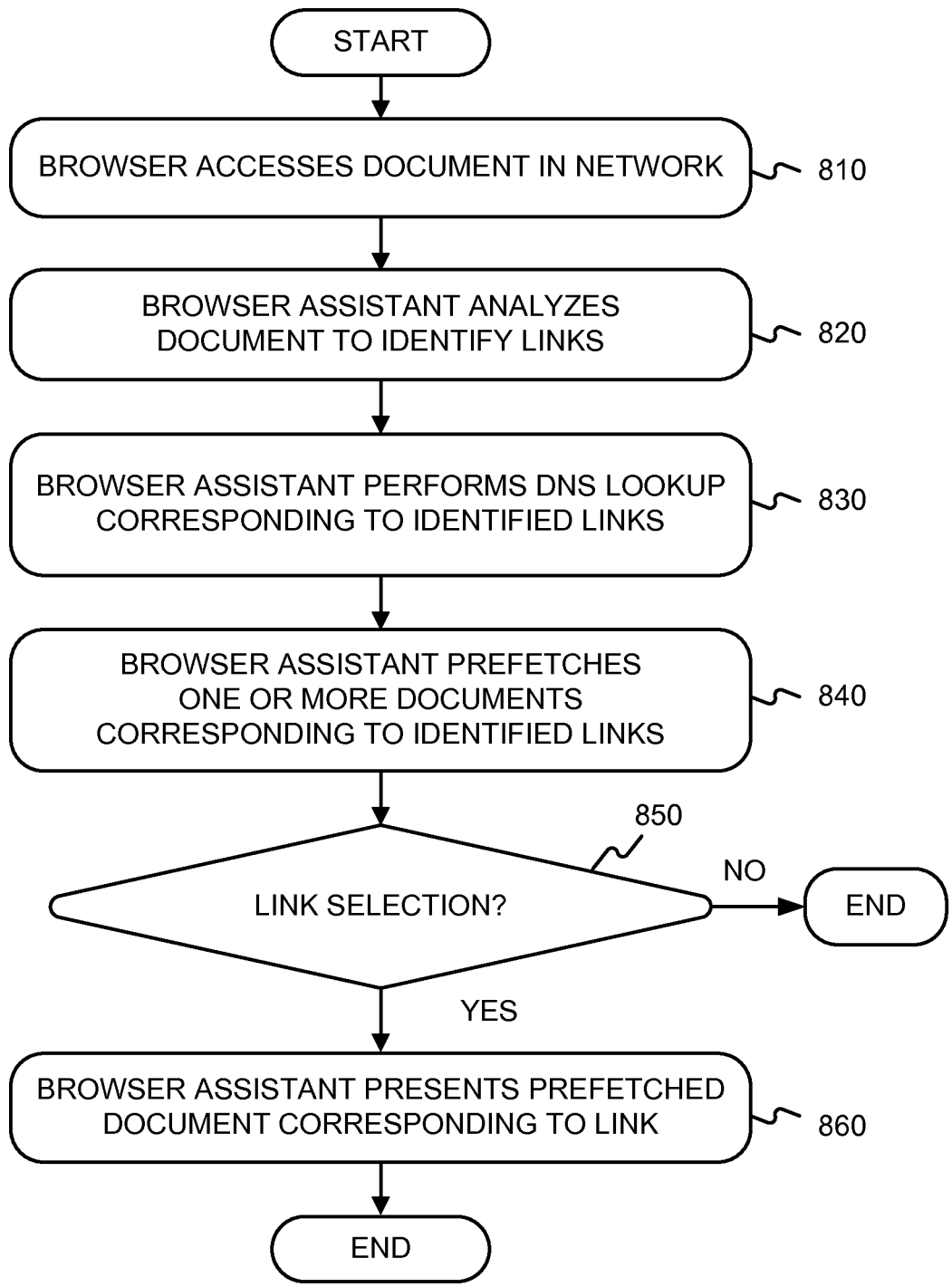
FIG. 8 is a flowchart of exemplary processing for prefetching documents in accordance with an implementation consistent with the present invention.

FIG. 8 is a flowchart of exemplary processing for prefetching documents in accordance with an implementation consistent with the present invention. Processing may begin with a user activating web browser software, such as browser 320 (FIG. 3), on a client, such as client 110 (FIG. 1). The user may then provide an address, such as a URL, of a document to the browser 320 or a query that the browser 320 may use to obtain one or more documents using a hierarchical directory or search engine, such as the search engine 125 maintained by the server 120.

The browser 320 may use the address or query to obtain a document maintained by a server, such as server 130, in the network 140 [act 810]. In one implementation consistent with the present invention, the document takes the form of a web page. In other implementations, the document may take the form of a list of links or topics from a hierarchical directory. The browser 320 may then display the document to the user. The browser assistant 330 may analyze the document to identify the links contained therein [act 820]. If the document takes the form of an HTML document, then the browser assistant 330 may parse the document to identify the links.

The browser assistant 330 may then perform a Domain Name Service (DNS) lookup for one or more of the links [act 830]. The browser assistant 330 may use conventional techniques to determine the Internet Protocol (IP) address and other information corresponding to the links. The actual number of links for which the browser assistant 330 performs the lookup operation may vary based on performance considerations. In one implementation consistent with the present invention, the browser assistant 330 performs the lookup operation for all of the links in the document. In another implementation, the browser assistant 330 performs the lookup operation for the first k links in the document, where k is an integer.

In yet another implementation, the browser assistant 330 determines a score for each of the links in the document. The score for a link may be related to, derived from, or the same as the score of the document to which the link points. The browser assistant 330 may use a number of different techniques to determine the score of a document. For example, each of the documents may be scored based on the scores of the documents that point to (i.e., link to) the current document. This technique is described in detail in S. Brin et al., "The Anatomy of a Large-Scale Hypertextual Web Search Engine," In Proceedings of the Seventh International World Wide Web Conference, pp. 107-117, 1998, which is hereby incorporated by reference.

In another technique, the score of a document may be determined as a function of its clickthrough rate (i.e., the number of times users clicked on the document over a period of time). The clickthrough rate may be obtained in a conventional manner by redirecting user clicks through the server hosting the document. Clickthrough measurements are commonplace in many current web sites, such as advertising web sites.

In yet another technique, the score of a document may be determined as a function of the popularity of the document or the web site containing the document. The popularity of a document may be obtained from traffic data published by various Internet traffic analysis companies (e.g., Media Metrix) or by analyzing HyperText Transfer Protocol (HTTP) traffic of a representative subset of users (e.g., from a web proxy log).

In a further technique, the score of a document may be determined based on input received before or at the time the document is accessed. The input might include the user query that resulted in the document being accessed. In this case, the score of a document may be based on the match between the query and the contents of the document. Alternatively, the input may include a user profile. For example, the user profile may include a set of words that have appeared in documents that the user has previously accessed, along with a score for each word denoting its estimated importance. In this case, the score of a document may be determined by considering the user profile to be a weighted query and evaluating the match between the user profile and the contents of the document.

These scoring techniques are meant to be examples. Other scoring techniques or combinations of scoring techniques may be used in other implementations consistent with the present invention.

The browser assistant 330 may determine the scores itself. For example, the browser assistant 330 may record information regarding the documents that a user previously accessed and determine the scores based on this information. Alternatively, the browser assistant 330 may interact with a server, such as the server 120. In this case, the server 120 may maintain information regarding the scores of documents maintained by other servers in the network 140. The server 120 may obtain information regarding the documents in the network 140 using, for example, a spider (i.e., a program that prowls a network to locate publicly accessible resources, such as documents). The browser assistant 330 may identify to the server 120 the document currently being accessed by the user. The server 120 may then inform the browser assistant 330 of the scores of the linked documents.

Once the scores of the links have been determined, the browser assistant 330 may perform the DNS lookup for k links with the highest scores, where k is an integer. Alternatively, the browser assistant 330 may perform the DNS lookup for links with scores above a predetermined threshold.

The browser assistant 330 may use the results of the DNS lookup to prefetch one or more documents corresponding to the links [act 840]. The browser assistant 330 may use conventional techniques to prefetch the documents and may store the documents in local memory (e.g., memory 230 or storage device 250). The actual number of documents that the browser assistant 330 prefetches may vary based on performance considerations. For example, the browser assistant 330 may prefetch documents corresponding to all or some of the links, as described above.

The user may select one or more of the links in the document in a conventional manner, such as by clicking on the link or highlighting the link [act 850]. The browser assistant 330 detects the selection. If the selected link corresponds to a link for which the browser assistant 330 prefetched the document, then the browser assistant 330 retrieves the prefetched document from memory and presents it to the user [act 860]. If the selected link corresponds to a link for which the browser assistant 330 failed to prefetch the document, then the browser assistant 330 may obtain the document from a server in the network 140 in a conventional manner and present the document to the user.

Exemplary Processing for Creating Links

Figure 9:
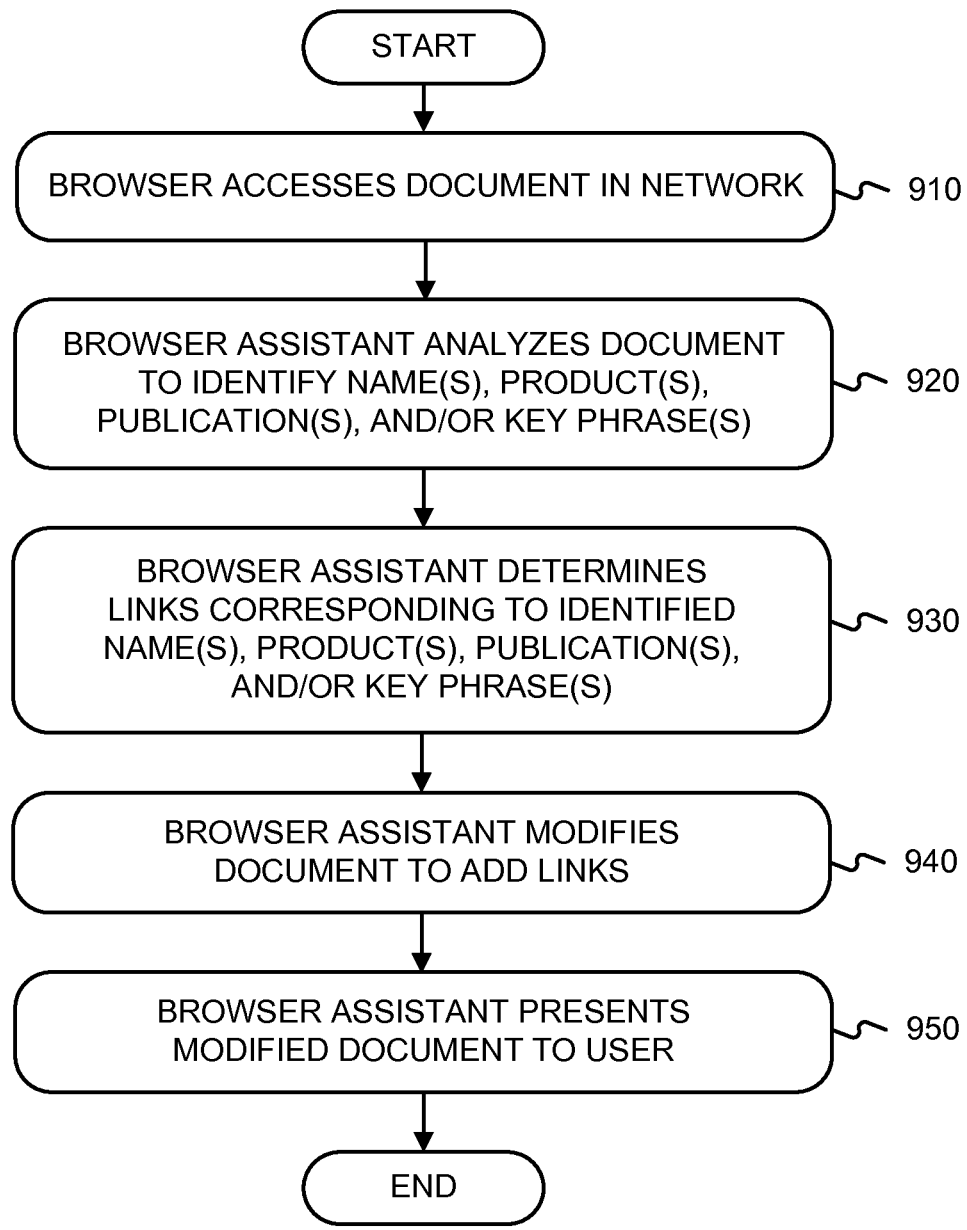
FIG. 9 is a flowchart of exemplary processing for creating links in accordance with an implementation consistent with the present invention.

FIG. 9 is a flowchart of exemplary processing for creating links in accordance with an implementation consistent with the present invention. Processing may begin with a user activating web browser software, such as browser 320 (FIG. 3), on a client, such as client 110 (FIG. 1). The user may then provide an address, such as a URL, of a document to the browser 320 or a query that the browser 320 may use to obtain one or more documents using a hierarchical directory or search engine, such as the search engine 125 maintained by the server 120.

The browser 320 may use the address or query to obtain a document maintained by a server, such as server 130, in the network 140 and may present the document to the user [act 910]. The browser assistant 330 may analyze the document to identify information, such as names of people, companies, or organizations, products, publications, and/or key phrases [act 920]. If the document takes the form of an HTML document, then the browser assistant 330 may parse the document to identify the information.

For the name(s), product(s), publication(s), and/or key phrase(s) identified, the browser assistant 330 may embed a link into the document [act 930]. For the name(s) identified, for example, the browser assistant 330 may embed into the document a link to a document whose incoming (i.e., linking) anchor text contains the name (e.g., the homepage corresponding to the name). For the product(s) identified, the browser assistant 330 may embed into the document a link to the producers, sellers, and/or reviews of the product. For the publication(s) identified, the browser assistant 330 may embed into the document a link to the URL where the publication can be found. For the key phrase(s) identified, the browser assistant 330 may embed into the document a link to a high quality document containing the key phrase.

The browser assistant 330 may use different techniques to determine the links. For example, the browser assistant 330 may send the name, product, publication title, or key phrase to a server, such as a server 130, in the network 140. The server 130 may maintain a database of names, products, publications, and key phrases. The server 130 may use the name, product, publication title, or key phrase as a query into the database to identify a link to a corresponding document.

In another implementation, the browser assistant 330 may generate a query containing the name, product, publication title, or key phrase. The browser assistant 330 may send the query to a search engine, such as the search engine 125. The search engine 125 may return a document containing the search results. The search results may take the form of a list of links. The browser assistant 330 may parse the document, extract one of the links, and use the URL corresponding to the link as the link for the name, product, publication title, or key phrase.

The browser assistant 330 may then modify the document to add the links [act 940]. The browser assistant 330 may add the links next to the corresponding name(s), product(s), publication(s), or key phrase(s) in the document or may list the links at another portion of the document. The browser assistant 330 may use other techniques to add the links. For example, the browser assistant 330 may convert a name, product, publication, and/or key phrase already present in the document into a hyperlink. The browser assistant 330 may then present the modified document to the user [act 950]. For example, the browser assistant 330 may present the modified document as a web page in a browser window.

In another implementation consistent with the present invention, the browser assistant 330 may present the links separately from the document, such as in a web page in a browser window or a pop-up window. Alternatively, the browser assistant 330 may present the links as a list of selectable items within a user interface of the browser assistant 330. In one instance, the user interface of the browser assistant 330 includes a pull-down or pop-up menu. In another instance, the user interface includes a side-bar or a scrolling list.

To illustrate the above processing, assume that a document contains a single paragraph as follows:

> Google performs "and" queries by default, so it only returns those pages that include all of the search terms. To restrict a search further, just include more terms. Google also automatically prefers pages in which the query terms are in close proximity. For example, to plan a vacation to Hawaii, simply enter Hawaii vacation into the search field and click on Google Search.

The browser assistant 330 may identify the company name "Google," the state name "Hawaii," and the key phrase "Hawaii vacation." For the name "Google," the browser assistant 330 may add a link to the Google web site (www.google.com). For the name "Hawaii," the browser assistant 330 may add a link to the web site of the state government of Hawaii (www.hawaii.gov). For the key phrase "Hawaii vacation," the browser assistant 330 may add a link to the web site for a Hawaii State Vacation Planner (www.hshawaii.com). FIG. 10 illustrates a modified document that includes the links described above. As illustrated, the links may be located next to the identified names and key phrase.

CONCLUSION

Systems and methods consistent with the present invention provide a browser assistant that provides additional search-related functionality to a web browser to improve a user's search experience. For example, the browser assistant may permit a user to initiate a search by selecting a word, phrase, or paragraph in a document or the entire document itself; prefetch documents corresponding to links in a current document; and supplement the current document with links to related information.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 6, 8, and 9, the order of the acts may be modified in other implementations consistent with the present invention.

Also, while processes consistent with the present invention have been described as acts performed by the browser assistant 330 or browser 320, at least some of the acts may be performed by a server, such as the server 120.

The scope of the invention is defined by the claims and their equivalents.

What is claimed is:

1. A method comprising:
   receiving, by one or more processors, information associated with a selection of one or more words in a document;
   determining, by the one or more processors and based on the received information, whether the selected one or more words are associated with a first type of search or a second type of search,
      the first type of search being different than the second type of search;
   selectively generating, by the one or more processors and based on determining whether the selected one or more words are associated with the first type of search or the second type of search, a first search query or a second search query,
      the first search query using the selected one or more words, and
      the second search query using one or more textual concepts in the selected one or more words,
         the one or more textual concepts being determined:
            based on determining that the selected one or more words are associated with the second type of search, and
            using a summarization technique;
   receiving, by the one or more processors and based on the first search query or the second search query, search results; and
   providing, for presentation and by the one or more processors, the received search results.

2. The method of claim 1, where, when selectively generating the first search query, the method includes:
   determining that a plurality of words are selected; and
   treating the plurality of words as a plurality of search terms for the first search query, each one of the plurality of words corresponding to a different one of the plurality of search terms.

3. The method of claim 1, where, when selectively generating the first search query, the method includes:
   determining that a plurality of words are selected; and
   treating the plurality of words as a single search term for the first search query.

4. The method of claim 1, where selectively generating the first search query or the second search query includes generating the second query, and when determining the one or more textual concepts in the selected one or more words, the method includes:
   determining at least one main textual concept associated with the one or more textual concepts in the selected one or more words.

5. The method of claim 1, further comprising:
   determining whether the selected one or more words satisfy a particular threshold quantity of words; and
   determining, based on determining that the selected one or more words satisfy the particular threshold quantity of words, that the selected one or more words are associated with the second type of search.

6. The method of claim 5, where the particular threshold quantity of words corresponds to one of:
   a paragraph of the document, or
   an entire content of the document.

7. The method of claim 1, further comprising:
   determining whether the selected one or more words satisfy a particular threshold quantity of words; and
   determining, based on determining that the selected one or more words do not satisfy the particular threshold quantity of words, that the selected one or more words are associated with the first type of search.

8. The method of claim 1, where the one or more textual concepts are determined using a subset of the selected one or more words.

9. A system comprising:
   one or more devices to:
      receive information associated with a selection of one or more words in a document;
      determine, based on the received information, whether the selected one or more words are associated with a first type of search or a second type of search, the first type of search being different than the second type of search;

selectively generate, based on determining whether the selected one or more words are associated with the first type of search or the second type of search, a first search query or a second search query,
the first search query using the selected one or more words, and
the second search query using one or more textual concepts in the selected one or more words,
the one or more textual concepts being determined:
based on determining that the selected one or more words are associated with the second type of search, and
using a vector space model;

receive, based on the first search query or the second search query, search results; and provide, for presentation, the received search results.

10. The system of claim 9, where, when selectively generating the first search query using the selected one or more words, the one or more devices are further to:
determine that a plurality of words are selected; and
treat the plurality of words as a plurality of search terms for the first search query,
each one of the plurality of words corresponding to a different one of the plurality of search terms.

11. The system of claim 9, where, when selectively generating the first search query using the selected one or more words, the one or more devices are further to:
determine that a plurality of words are selected; and
treat the plurality of words as a single search term for the first search query.

12. The system of claim 9, where the one or more devices, when selectively generating the first search query or the second search query, are to generate the second query, and the one or more devices, when determining the one or more textual concepts in the selected one or more words, are further to:
determine at least one main textual concept associated with the one or more textual concepts in the selected one or more words.

13. The system of claim 9, where the one or more devices are further to:
determine whether the selected one or more words satisfy a particular threshold quantity of words; and
determine, based on determining that the selected one or more words satisfy the particular threshold quantity of words, that the selected one or more words are associated with the second type of search.

14. The system of claim 13, where the particular threshold quantity of words corresponds to one of:
a paragraph of the document, or
an entire content of the document.

15. The system of claim 9, where the one or more devices are further to:
determine whether the selected one or more words satisfy a particular threshold quantity of words; and
determine, based on determining that the selected one or more words do not satisfy the particular threshold quantity of words, that the selected one or more words are associated with the first type of search.

16. The system of claim 9, where the one or more textual concepts are determined using a subset of the selected one or more words.

17. A non-transitory computer-readable storage medium storing instructions, the instructions comprising:
one or more instructions which, when executed by at least one processor, cause the at least one processor to:
receive information associated with a selection of one or more words in a document;
determine, based on the received information, whether the selected one or more words are associated with a first type of search or a second type of search,
the first type of search being different than the second type of search;
selectively generate, based on determining whether the selected one or more words are associated with the first type of search or the second type of search, a first search query or a second search query,
the first search query using the selected one or more words, and
the second search query using one or more textual concepts in the selected one or more words,
the one or more textual concepts being determined:
based on determining that the selected one or more words are associated with the second type of search, and
using a summarization technique;
receive, based on the first search query or the second search query, search results; and
provide, for presentation, the received search results.

18. The medium of claim 17, where the one or more instructions to selectively generate the first search query using the selected one or more words include:
one or more instructions to determine that a plurality of words are selected; and
one or more instructions to treat the plurality of words as a plurality of search terms for the first search query,
each one of the plurality of words corresponding to a different one of the plurality of search terms.

19. The medium of claim 17, where the one or more instructions to selectively generate the first search query using the selected one or more words include:
one or more instructions to determine that a plurality of words are selected; and
one or more instructions to treat the plurality of words as a single search term for the first search query.

20. The medium of claim 17, where the instructions further comprise:
one or more instructions to determine whether the selected one or more words satisfy a particular threshold quantity of words; and
one or more instructions to selectively determine, based on whether the selected one or more words satisfy a particular threshold quantity of words, whether the selected one or more words are associated with the first type of search or the second type of search,
the selected one or more words being associated with the first type of search when the selected one or more words do not satisfy the particular threshold quantity of words, and
the selected one or more words being associated with the second type of search when the selected one or more words satisfy the particular threshold quantity of words.

21. A method comprising:
determining, by one or more processors, whether one or more selected words are associated with a first type of search or a second type of search,
the first type of search being different than the second type of search;
selectively generating, by the one or more processors and based on determining whether the one or more selected words are associated with the first type of search or the second type of search, a first search query or a second search query, the first search query using the one or more selected words, and the second search query using one or more textual concepts in the one or more selected words, the one or more textual concepts being determined:

based on determining that the one or more selected words are associated with the second type of search, and using a summarization technique;

receiving, by the one or more processors and based on the first search query or the second search query, search results; and providing, for presentation and by the one or more processors, the received search results.

* * * * *